(12) United States Patent
Pan

(10) Patent No.: US 7,391,556 B2
(45) Date of Patent: Jun. 24, 2008

(54) ULTRA-THIN DISPLAY SYSTEM

(75) Inventor: Shaoher X. Pan, San Jose, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 108 days.

(21) Appl. No.: 11/461,413

(22) Filed: Jul. 31, 2006

(65) Prior Publication Data

US 2008/0024857 A1      Jan. 31, 2008

(51) Int. Cl.
G02B 26/08 (2006.01)
G02B 26/00 (2006.01)
H04N 9/04 (2006.01)

(52) U.S. Cl. .................... 359/298; 359/291; 359/202; 348/210.99; 345/156

(58) Field of Classification Search ............ 359/201, 359/202, 204, 214, 217, 226, 316, 290, 291, 359/298; 348/201–205, 210.99, 146, 168, 348/551, E3.009, E5.139; 345/156; 250/330; 349/57, 113
See application file for complete search history.

(56) References Cited

U.S. PATENT DOCUMENTS

| | | | |
|---|---|---|---|
| 5,661,591 A | 8/1997 | Lin et al. | 359/290 |
| 6,059,412 A | 5/2000 | Sugita | 353/37 |
| 6,351,324 B1 | 2/2002 | Flint | 359/202 |
| 6,992,810 B2 | 1/2006 | Pan et al. | 359/290 |
| 2003/0174120 A1 | 9/2003 | Weiner et al. | 345/156 |
| 2004/0125461 A1 | 7/2004 | Kawamura | 359/668 |
| 2005/0128564 A1 | 6/2005 | Pan | 359/291 |

FOREIGN PATENT DOCUMENTS

EP   1 628 155 A1   2/2006

OTHER PUBLICATIONS

Larry J. Hornbeck, "Digital Light Processing™ for High-Brightness, High-Resolution Applications", Feb. 10-12, 1997, San Jose, CA pp. 1-14.

*Primary Examiner*—Loha Ben
(74) *Attorney, Agent, or Firm*—Fish & Richardson P.C.

(57) ABSTRACT

A display system includes a transparent tapered plate comprising a first face, a second face, and a third face. The first face is substantially smaller than the second face and the third face. The display system also includes a row of tiltable mirror plates each comprising a reflective surface. Each of the mirror plates is configured to tilt to an "on" position to reflect incident light in an "on" direction or to tilt to an "off" position to reflect incident light in an "off" direction. An optical scanning system is configured to control the direction of the light reflected by the mirror plates in the "on" direction. The row of the tiltable mirror plates, optical scanning system and the tapered plate are configured to allow the light reflected by the row of mirror plates in the "on" direction to enter the tapered plate at the first face, be reflected by the second face, and produce a line of image pixels on the third face. The optical scanning system is configured to scan the line of image pixels across the third face to produce a display image.

33 Claims, 9 Drawing Sheets

ULTRA-THIN DISPLAY SYSTEM

BACKGROUND

The present disclosure relates to display technologies, in particular, projection-type display devices.

Light projection is used to display images on large surfaces, such as large computer displays or television screens. In a front projection system, an image beam is projected from an image source onto a screen, which reflects the light toward a viewer positioned in front of the screen. In rear projection systems, the image beam is projected onto the rear side of a screen and transmitted toward a viewer located in front of the screen.

System size is an important consideration for projection-type display device. For rear projection display applications, a small footprint is usually desirable because the project-type display is often compared to the thin flat-panel displays based on liquid crystal, plasma, and organic light emitting diode technologies.

The light source for a project-type display can be produced by a spatial light modulator (SLM) based on a micro mirror array. In general, a micro mirror array can include an array of cells, each of which includes a mirror plate that can be tilted about an axis and, furthermore, circuitry for generating electrostatic forces that can tilt the mirror plate. In a digital mode of operation, for example, there are two positions at which the mirror plate can be tilted. In an "on" position or state, the micro mirror reflects incident light to form an image pixel in an image display. In an "off" position or state, the micro mirror directs incident light away from the image display.

SUMMARY OF THE INVENTION

In a general aspect, the present invention relates to a display system including a transparent tapered plate comprising a first face, a second face, and a third face, wherein the first face is substantially smaller than the second face and the third face; a row of tiltable mirror plates each comprising a reflective surface, wherein each of the mirror plates is configured to tilt to an "on" position to reflect incident light in an "on" direction or to tilt to an "off" position to reflect incident light in an "off" direction; and an optical scanning system configured to control the direction of the light reflected by the mirror plates in the "on" direction, wherein the row of the tiltable mirror plates and the tapered plate are so configured to allow the light reflected by the row of mirror plates in the "on" direction to enter the tapered plate at the first face, be reflected by the second face, and produce a line of image pixels on the third face, and wherein the optical scanning system is configured to scan the line of image pixels across the third face to produce a display image.

In another general aspect, the present invention relates to a method for producing a display image. The method includes selectively tilting one or more of tiltable mirror plates to "on" positions, wherein the tiltable mirror plates are distributed in one or more rows; reflecting an incident light toward an "on" direction at the one or more of the tiltable mirror plates that are tilted to the "on" positions; receiving the light in the "on" direction at a first face of a transparent tapered plate; reflecting the light entering the first face of a tapered plate at a second face of the tapered plate; forming a first line of image pixels in a display image on a third face of the tapered plate, wherein the first face is substantially smaller than the second face and the third face; and changing the direction of the light in the "on" direction using a scanning system to produce a second line of image pixels in the display image on the second face of the tapered plate.

In yet another aspect, a display system is described that has multiple light sources, multiple beams dividers, a row of tiltable mirror plates, an optical scanning system and a transparent tapered plates. The first of the beam dividers redirects light from one of the sources. A second of the sources emits light toward the first of the beam dividers. A second of the beam dividers allows light from the first beam divider to pass through and redirects light from a third light source. One of the first, second or third colors that comes from the second beam divider is reflected in an "on" or an "off" direction by mirrors of the row of tiltable mirror plates. The light in th4e "on" direction is directed toward the optical scanning system toward the tapered plate. In some embodiments, the light sources and the beam dividers are in other configurations.

In another general aspect, a display system is described having a first light source configured to emit a first color light; a first row of tiltable mirror plates each comprising a reflective surface, wherein each of the mirror plates is configured to tilt to an "on" position to reflect the first color light in an "on" direction or to tilt to an "off" position to reflect the first color light in an "off" direction; a second light source configured to emit a second color light; a second row of tiltable mirror plates; a third light source configured to emit a first color light; a third row of tiltable mirror plates; a beam divider or a X-cube configured to change the direction of at least one of the first color light, the second color light or the third color light reflected in the "on" direction; a transparent tapered plate comprising a first face, a second face, and a third face, wherein the first face is substantially smaller than the second face and the third face; and an optical scanning system configured to control the direction of the light from the beam divider or X-cube toward the transparent tapered plate. The optical scanning system and the tapered plate are configured to allow the light to enter the tapered plate at the first face, be reflected by the second face, and produce a line of image pixels on the third face and the optical scanning system is configured to scan the light reflected by the mirror plates in the "on" direction across the first face. Optionally, the display system has another set of rows for redirecting the light from the beam divider or the X-cube.

In yet another aspect a display system is described a first light source configured to emit a first color light; a first row of tiltable mirror plates each comprising a reflective surface, wherein each of the mirror plates is configured to tilt to an "on" position to reflect the first color light in an "on" direction or to tilt to an "off" position to reflect the first color light in an "off" direction; a second light source configured to emit a second color light; a second row of tiltable mirror plates each comprising a reflective surface, wherein each of the mirror plates is configured to tilt to an "on" position to reflect the second color light in an "on" direction or to tilt to an "off" position to reflect the second color light in an "off" direction; a first beam divider through which the first color light in the "on" direction passes and which redirects the second color light in the "on" direction; a third light source configured to emit a third color light; a third row of tiltable mirror plates each comprising a reflective surface, wherein each of the mirror plates is configured to tilt to an "on" position to reflect the third color light in an "on" direction or to tilt to an "off" position to reflect the third color light in an "off" direction; a second beam divider through which the first color light and the second color light pass and which redirects third color light in the "on" direction; a transparent tapered plate comprising a first face, a second face, and a third face, wherein the first face is substantially smaller than the second face and the third face; an optical scanning system configured to control the direction of the light from the second beam divider toward the transparent tapered plate. The row of the optical scanning system and the tapered plate are configured to allow the light reflected by the mirror plates in the "on" direction to enter the tapered plate at the first face, be reflected by the second face, and produce a line of image pixels on the third face and the optical scanning system is configured to scan the light reflected by the mirror plates in the "on" direction across the first face.

Implementations of the system may include one or more of the following. The first face, the second face, and the third face can be substantially flat. The second face can be oriented at an angle smaller than 30 degrees relative to the third face. The second face can be oriented at an angle smaller than 15 degree relative to the third face. The second face and the third face can be separated by the first face and a fourth face opposing to the first face. The second face and the third face can intersect and form a wedge between the second face and the third face. The first face can be substantially perpendicular to the third face. The tapered plate can include two opposing faces each of which intersects with each of the first face, the second face, and the third face. The light entering the tapered plate at the first face can be reflected at the second face reflects by total reflection. The optical scanning system can include a reflective surface configured to reflect the light in the "on" direction toward the first face of the tapered plate; and a transport mechanism configured to change the orientation of the reflective surface to produce the second line of image pixels in the display image. At least one of the tiltable mirror plates can be connected with two hinges supported by a substrate and the mirror plate is configured to tilt about an axis defined by the two hinges. At least one of the tiltable mirror plates can be configured to tilt when an electrostatic force is applied to the tiltable mirror plate. The transparent tapered plate can be made of a glass material. The tapered plate can be a polyhedron. The tapered plate can include two opposing faces substantially flat and parallel to each other. At least one of the first face, the second face, and the third face can be a parallelogram. The display system can further include one or more colored light sources each configured to produce the incident light in substantially a single color. The display system can further include two or more spatial light modulators each including a row of tiltable mirror plates, wherein the tiltable mirror plates in each of the two or more spatial modulators are configured to receive incident light in substantially a single color. The display system can further include at least one of a beam divider and a X-cube, wherein the beam divider or the X-cube is configured to change the direction of the light emitted by at least one of the colored light sources.

The present specification discloses an ultra-thin display system that is suitable for projection or front viewing types of display applications. The ultra-thin display system includes a transparent tapered plate that includes a narrow base face, a flat vertical face, and a slanted face that is oriented at an acute angle relative to the vertical face. Light reflected by an array of tiltable micro mirrors enters the narrow base face, is then reflected by the slanted face, and forms a display image at the vertical surface of the tapered plate. A display image can also be formed on a different display surface by the light projected from the flat vertical face. The narrow base face of the tapered plate allows the display system to have a small foot print, which is highly desirable for rear-projection display systems.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and from a part of the specification, illustrate embodiments of the present specification and, together with the description, serve to explain the principles of the specification.

FIG. 1b is a perspective rear view of the ultra-thin display system of FIG. 1a.

FIG. 1c is a detailed perspective view of the transparent tapered plate in the ultra-thin display system of FIG. 1a.

DETAILED DESCRIPTION

Figure 1A:
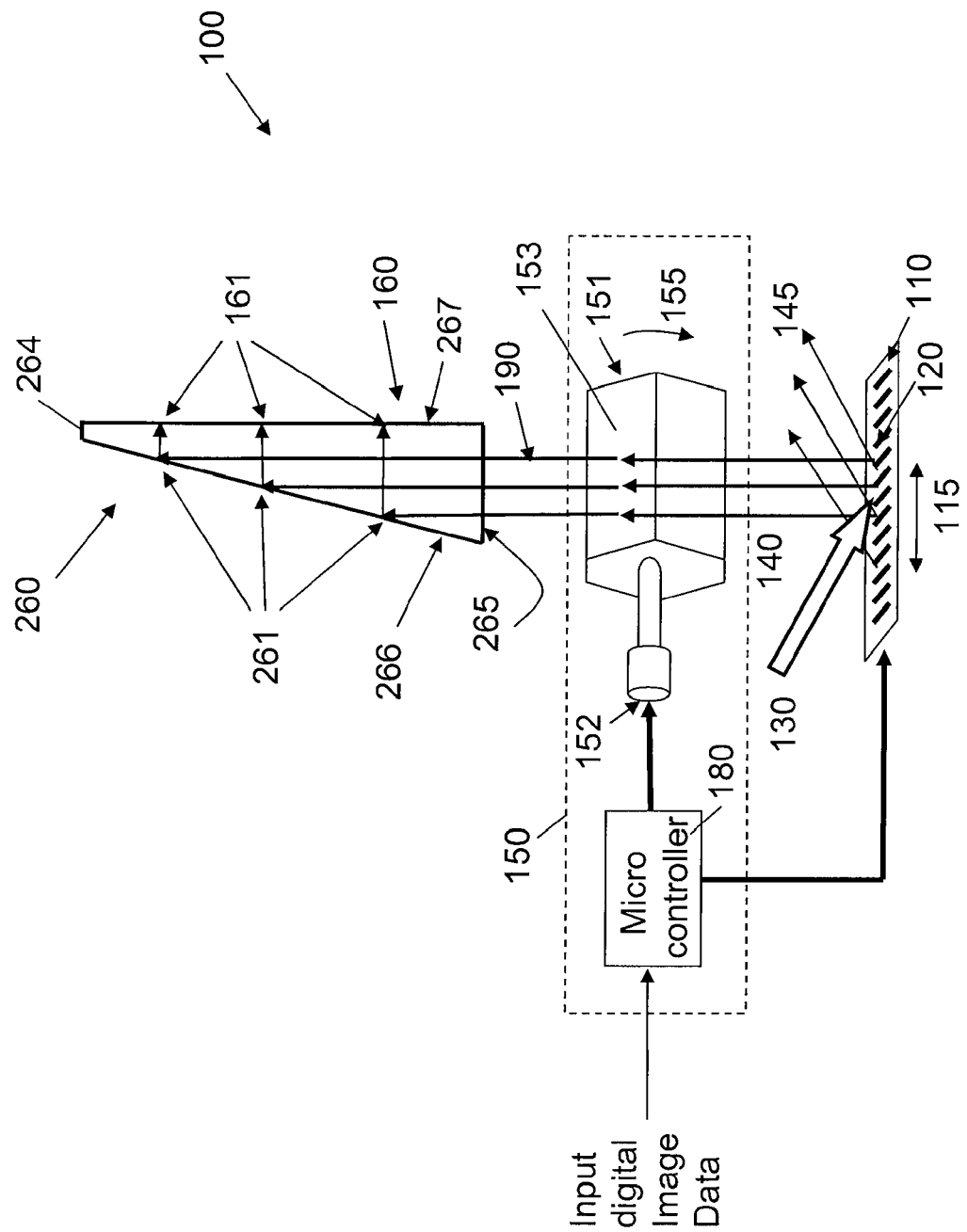
FIG. 1a is a perspective side view of an ultra-thin display system in accordance with the present specification.
Figure 1B:
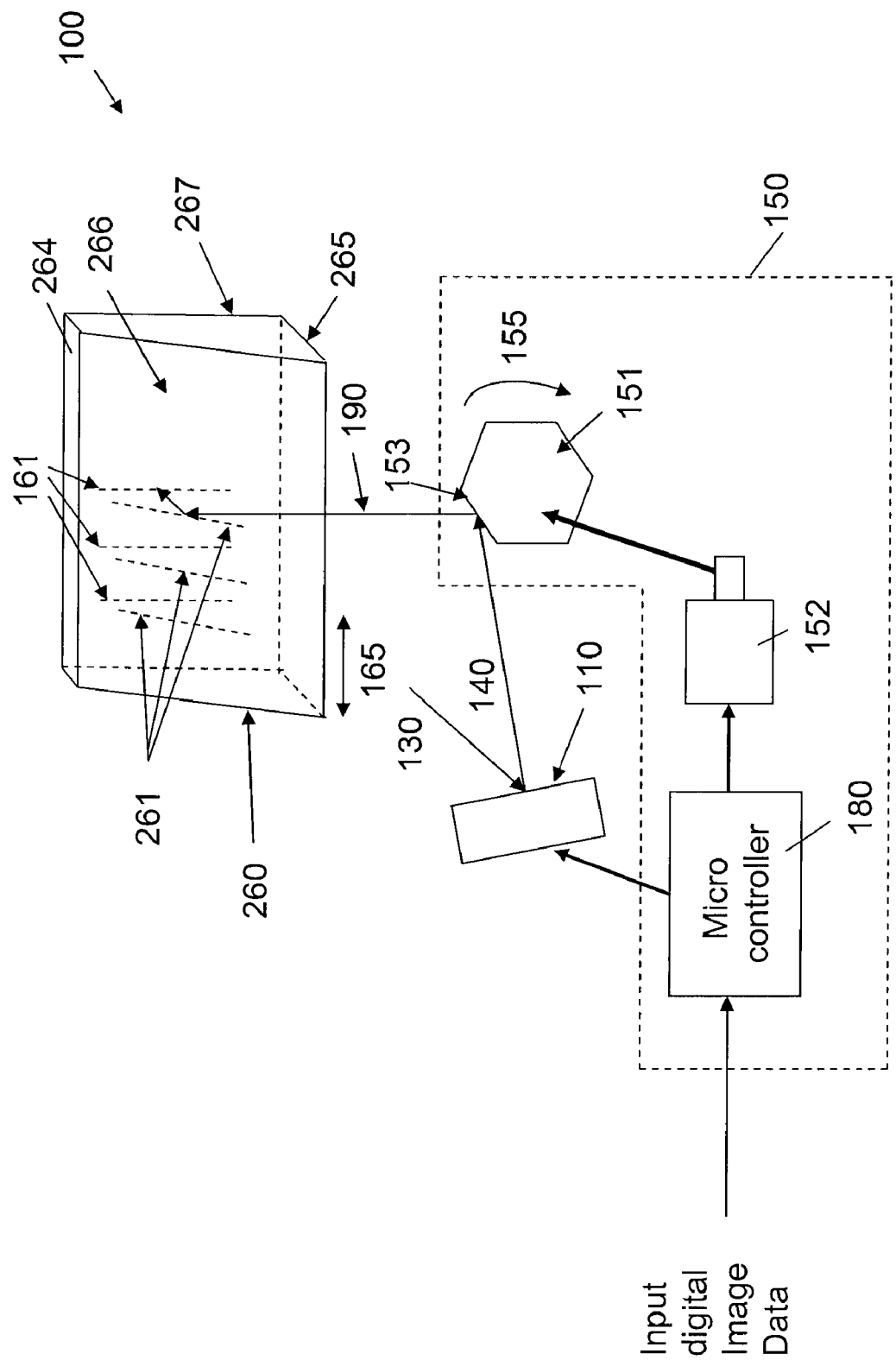

FIGS. 1a and 1b are respectively a perspective side view and a perspective rear view of an ultra-thin display system 100. The ultra-thin display system 100 includes a spatial light modulator 110, an optical scanning system 150, and a transparent tapered plate 260. The transparent tapered plate 260 can be made of a glass material. The tapered plate 260 includes a first face 265 at the base of the tapered plate 260, a slanted second face 266, and a third face 267. The spatial light modulator 110 includes a plurality of tiltable micro mirrors 120 that are distributed in one or more rows along a direction 115. In the specific implementation shown in FIGS. 1a and 2, the direction 115 is substantially parallel to the narrow dimension of the first face 265 (the base face) of the tapered plate 260. In the particular implementation shown in FIG. 1A, each illuminated row of tiltable micro mirrors 120 can produce a column of image pixels in a display image 160 on the third face 267. Although a single row of tiltable micro mirrors 120 is shown in FIG. 1a, the spatial light modulator 110 can include a small number of rows (for example, less than 10 rows) of tiltable micro mirrors 120. The number of rows of micro mirrors in the spatial light modulator 110 is typically much smaller than the number of columns of pixels in a typical display image to be produced by the ultra-thin display system 100.

As described in more detail below, the tiltable mirrors 120 can be individually addressed to tilt in two or more directions by a micro controller 180. The micro mirrors 120 can tilt to the "on" positions to reflect incident light 130 to produce reflected light 140 in the "on" direction. Alternatively, the incident light 130 can be directed by the micro mirrors 120 in the "off" positions to produce reflected light 145 in the "off" direction (the incident light 130 and the reflected light 145 in the "off" direction are out of the plane of illustration and thus not shown in FIG. 1b). The light 145 can subsequently be absorbed by a light absorber (not shown) to prevent flare light. The incident light 130 can be produced by various light sources, such as a light emitting diode (LED) or an arc lamp.

The micro controller 180 receives input image data, such as video data including a series of image frames. The micro controller 180 controls the orientations of the tiltable mirrors 120 to the "on" or "off" positions in accordance with the pixel values at a line of image pixels in the input digital image. The light 140 reflected by the "on" micro mirrors 120 is projected by the optical scanning system 150 to form a display image on the third face 267. The projected light forms a line of image pixels 161 on the third face 267 in accordance with the pixel values in a line of image pixels in the input digital image.

In one implementation, the optical scanning system 150 includes a polygon 151 that includes one or more flat reflective surfaces 153. The flat polygon surfaces 153 can reflect the light 140 toward the tapered plate 260 to form an image on the third face 267. The polygon 151 can be made of glass, metal, or plastic. The polygon surfaces 153 can be coated with a thin layer of reflective metal such as aluminum. The polygon surfaces 153 are required to be flat within a tolerance such that the image pixels can be formed uniformly on the third face 267. For example, one criterion for the flatness of the polygon surfaces 153 is that the distortions of image pixel locations in the displayed image the third face 267 should be less than ½ the width of an image pixel. Another criterion is that the roughness of the polygon surfaces 153 should be smaller than one or a fraction of a wavelength of visible light over the illuminated area of a polygon surface 153.

The optical scanning system 150 also includes a transport mechanism 152 that can rotate the polygon 151 about a rotational axis. In one implementation, the transport mechanism 152 includes a motor that is under the control of the micro controller 180. The motor can be a DC motor or a digital stepper motor. The micro controller 180 controls the transport mechanism 152, which in turn rotates the polygon 151 about the rotational axis in synchronization with the modulation of the micro mirrors 120. The rotated polygon 151 changes the directions of the light reflected by the polygon 151, such that the light projected the third face 267 is scanned along a lateral direction 165. In the particular implementation shown in FIGS. 1a and 1b, the direction 165 is parallel to the lateral (or wide) dimension of the first face 265. The direction 115 is parallel to the depth (or narrow) dimension of the first face 265. In one implementation, the rotational axis of the polygon 151 can be substantially perpendicular to the lateral direction 165 and substantially parallel to the lines of image pixels 161, which are formed on the surface of the third face 267. The polygon 151 can rotate in a single direction, such as a clockwise direction 155 or a counterclockwise direction. The polygon 151 can also rotate in both clockwise and counterclockwise directions.

A projection system (not shown) can be included between the polygon 151 and the tapered glass plate 260 to adjust the path of the light rays reflected by the polygon surfaces 253 to produce desired dimensions and geometry in the display image. For example, the projection system can correct for keystoning image distortion that would otherwise occur in the display image.

As the polygon 151 rotates through different angular positions, the micro controller 180 controls the micro mirrors 120 to the "on" or "off" positions in accordance with corresponding pixel values at a vertical line of image pixels in the input digital image. At one angular position, a row of micro mirrors can form a line of image pixels 161 in the third face 267. However, as the polygon 151 rotates to different angular positions, different lines of image pixels 161, etc., are formed in the third face 267. The lines of image pixels 161 can be formed in progressive or interlaced fashion. The lines of image pixels 161 can together form a two-dimensional display image 160 in the third face 267. The lines of image pixels 161 formed on the third face 267 can scatter light such that viewers at different positions in front of the tapered plate 260 can view the display image 160.

Figure 1C:
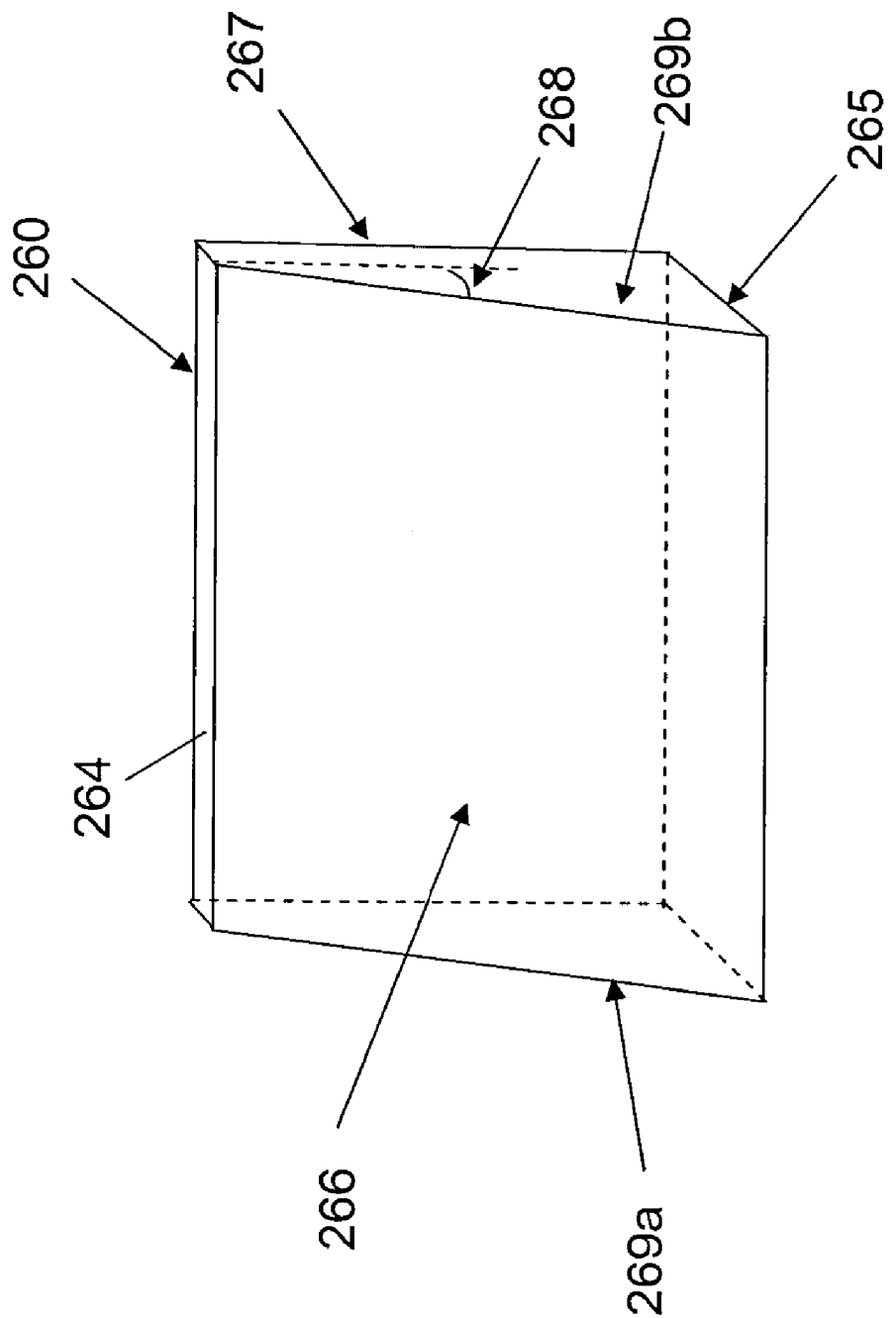

FIG. 1c is a detailed perspective view of the tapered plate 260 in the ultra-thin display system 100. The tapered plate 260 includes the first face 265 at the base of the tapered plate 260, the slanted second face 266, and the third face 267. The light 190 reflected from the polygon 151 enters the first face 265, is then reflected at the second face 266, and subsequently forms a display image on the third face 267. The light can be reflected by total reflection at the second face 266. In one implementation, the second face 266 can also be coated with a layer of reflective material, such as aluminum to increase the reflectivity. The light can be projected toward the third face 267 and form lines of image pixels 161 on the third face 267, as shown in FIGS. 1a and 1b.

The first face 265, the second face 266, and the third face 267 can all be flat to avoid optical distortions when the light passes through the first face 265 and the third face 267, or is reflected by the second face 266. The second face 266 is oriented at an angle 268 to the third face 267. The tapered plate 260 can further include two opposing faces 269a and 269b that intersect with the first face 265, the second face 266, and the third face 267. The two opposing faces 269a and 269b can be substantially flat and parallel to each other. The second face 266 and the third face 267 can be separated by an upper face 264 at the top of the tapered plate 260 as shown in FIGS. 1a-1c. Alternatively, the second face 266 and the third face 267 can intersect with each other at an edge at the top of the tapered plate 260. The tapered plate 260 can be a polyhedron bounded by flat faces.

One or more of the first face 265, the second face 266, and the third face 267 can be parallelograms. The third face 267 can be substantially perpendicular to the first face 265. In one implementation, the angle 268 can be an acute angle smaller than 30 degree. In another implementation, the angle 268 is smaller than 15 degree. The first face 265, the second face 266, and the third face 267 are configured to allow the light to enter the first face 265 and be totally reflected by the second face 266. The light 190 reflected by the polygon 151 at different orientations can be totally reflected at different line positions 261 to respectively product lines of image pixels 161 on the third face 267. Thus, the third face 267 can be the display surface for a rear-projection type display system. The narrow base face 265 of the tapered plate 260 allows for the ultra-thin display system 100 to have a small footprint.

Figure 2:
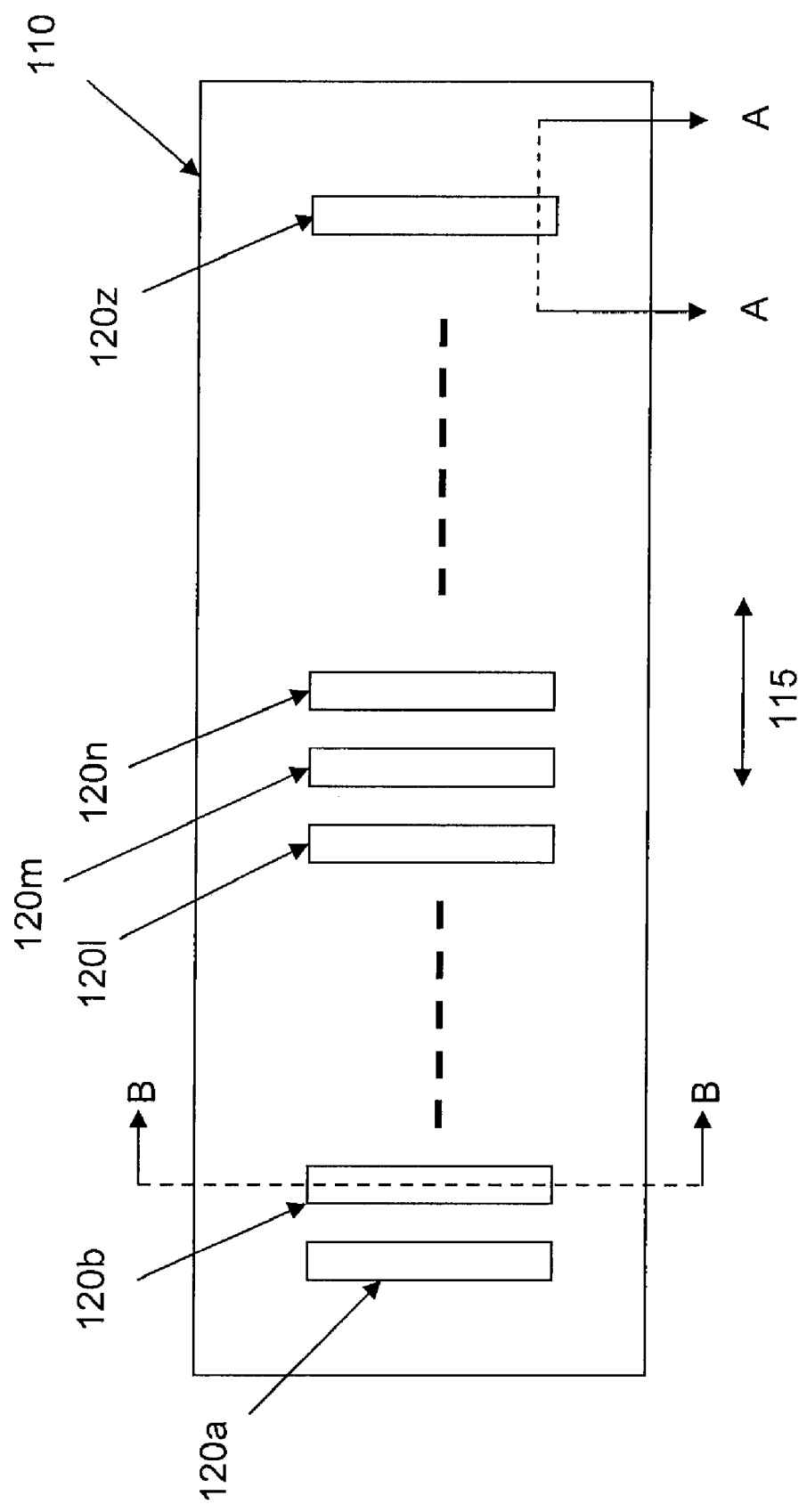
FIG. 2 is a detailed plan view of an implementation of the spatial light modulator in the ultra-thin display system of FIGS. 1a and 1b.

FIG. 2 is a detailed view of an exemplary spatial light modulator 110 that is compatible with the ultra-thin display system 100. The spatial light modulator 110 includes a plurality of micro mirrors 120a to 120z distributed in 1D array along the direction 115. In some implementations, the micro mirrors 120a-120z are rectangular shaped. The narrow dimensions of the micro mirrors 120a-120z are aligned along the direction 115 to maintain a high density of micro mirrors 120a-120z in the spatial light modulator 110 (which enables the formation of a high resolution display image in the third face 267). The long dimensions of the micro mirrors 120a-120z increase the mirror areas and thus the amount of the light reflected by the micro mirrors 120a-120z. In some implementations, the micro mirrors 120a to 120z can also have square, diamond, or other suitable shapes. The micro mirrors 120a-120z can each be tilted about an axis defined by a pair of hinges at the ends of the long dimensions of the mirrors. For example, the micro mirror 120a can be tilted about an axis along the line B-B. In some implementations, as shown in FIGS. 2-4, the hinges are hidden under the mirror plates. In another implementation, the hinges can also be at least partially exposed outside of their respective mirror plates.

Figure 3A:
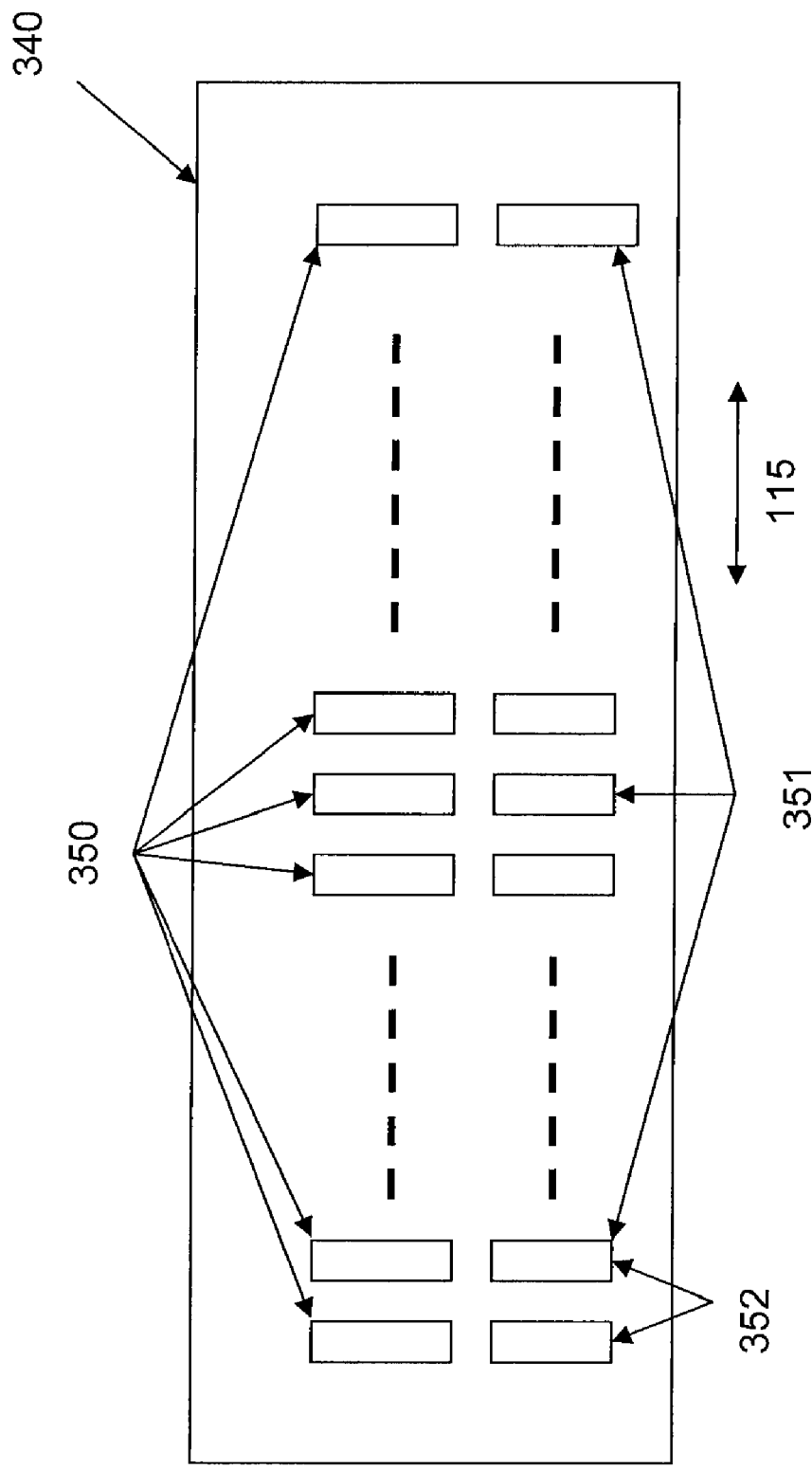
FIGS. 3a and 3b are detailed views of other implementations of the spatial light modulator in the ultra-thin display system of FIGS. 1a and 1b.
Figure 4:
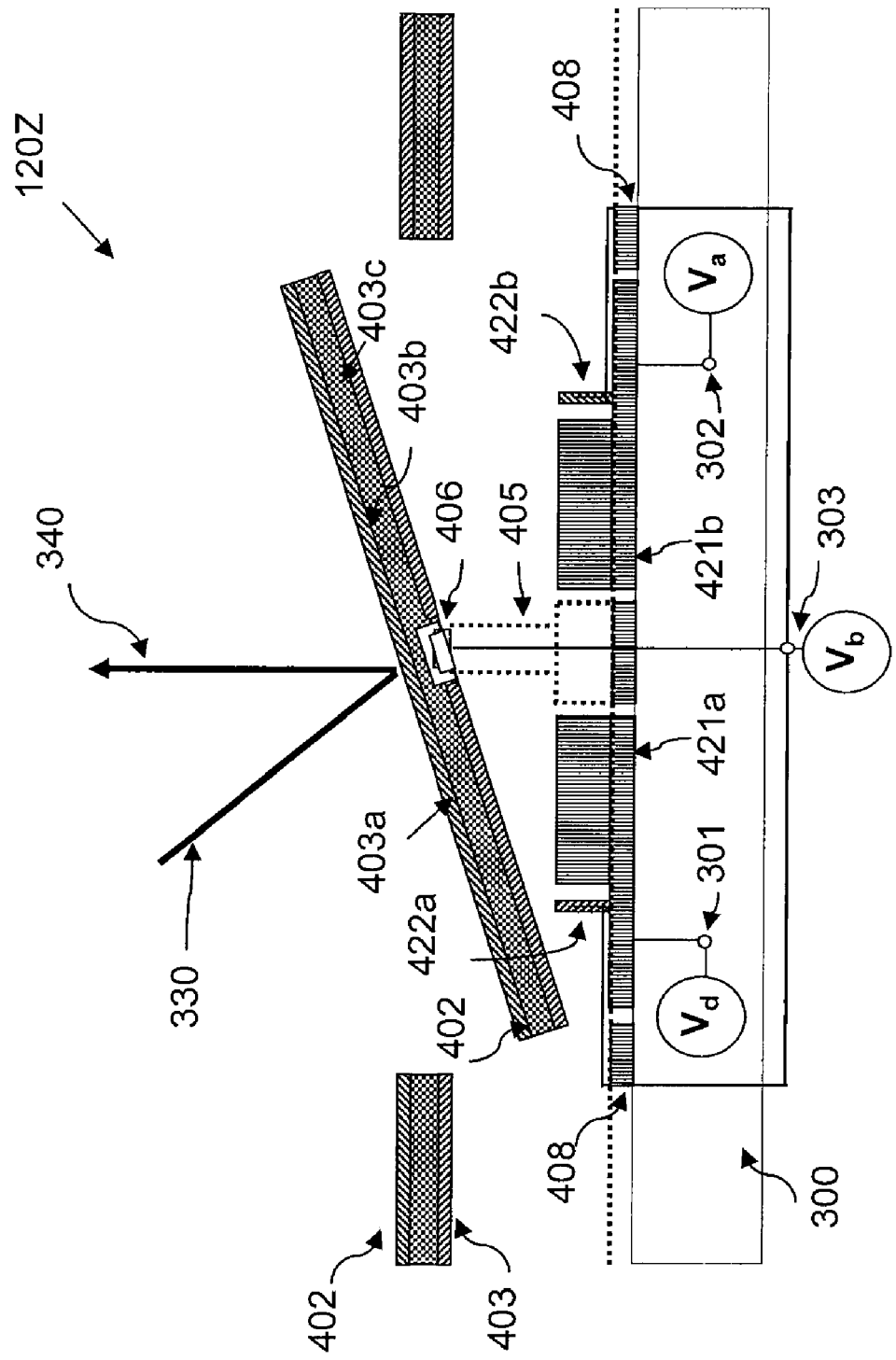
FIG. 4 is a cross-section view of an exemplified spatial light modulator along the line A-A in FIG. 2.

In another exemplary spatial light modulator compatible with the ultra-thin display system 100, a spatial light modulator 340, shown in FIG. 3*a*, includes two rows of micro mirrors 350 and 351, both distributed in the direction 115. The micro mirrors 350 and 351 can be rectangular, square, or of other shapes. The hinges 352 can be hidden and not visible from the top of the micro mirrors 350 and 351. The spatial light modulator 340 is capable of simultaneously displaying two lines of image pixels 161 on the third face 267 at each projected direction by the polygon 151. As the polygon 151 rotates to a different angular direction, the polygon 151 directs the light 140 to the third face 267 to form a different line 161 of image pixels. To avoid smearing between adjacent lines of image pixels, the polygon 151 can be rotated by a stepper motor. The polygon 151 can be held for a short line time for forming each pair of image pixel lines. When the polygon 151 rotates from one angular position to the next angular position, the incident line 130 can be briefly deflected away for the tapered plate 260 to produce light 145, as shown in FIG. 1*a*.

Figure 3B:
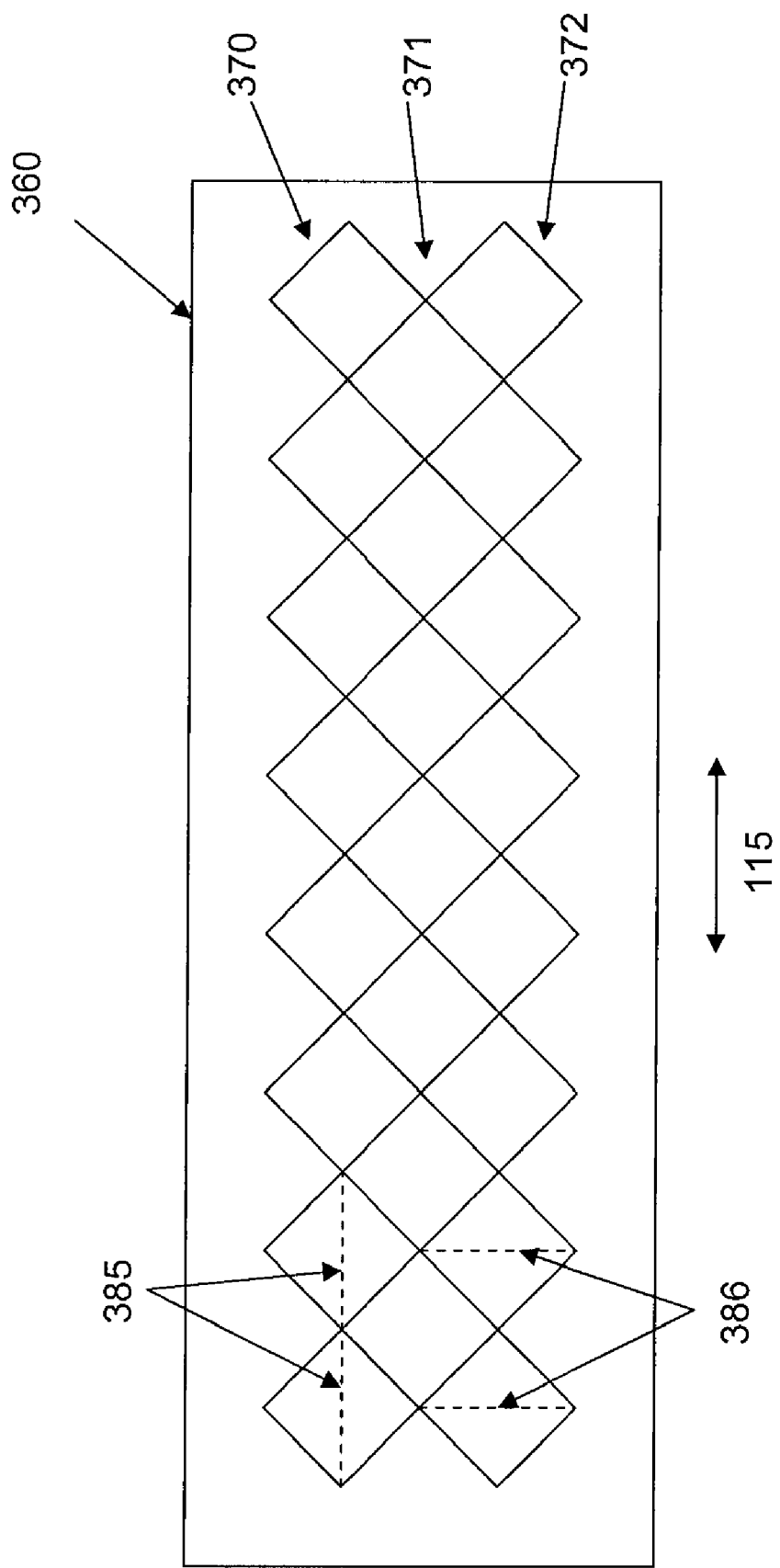

Another exemplary spatial light modulator compatible with the ultra-thin display system 100 is shown in FIG. 3*b*. The spatial light modulator 360 has three rows of micro mirrors 370, 371, and 372 distributed in the direction 115. The micro mirrors 370, 371, and 372, as shown, have diamond or square shapes. One diagonal line 385 (shown in phantom) of a micro mirror 370, 371, or 372 can be parallel to the direction 115. The micro mirror 370, 371, or 372 can tilt about a rotation axis 386 (shown in phantom) along the other diagonal line that is perpendicular to the direction 115. The rotation axis 386 can be defined by two pivot points provided by a pair of hinges hidden under a micro mirror.

The ultra-thin display system 100 can operate as follows. The spatial light modulator 110 can include 4000 micro mirrors in a 1-dimensional mirror array, as shown in FIG. 2. Thus, 4000 image pixels, or image lines, are formed from the bottom to the top of the plate 260. Each of the image lines 161 corresponds to a particular reflective orientation of the polygon 151. The ultra-thin display system 100 can be configured to provide a display image that is 4000 pixels high and 2000 pixels wide on the third face 267 of the tapered plate 260. To provide a monochrome video display at a bit depth of 8 bits and a frame rate of 60 Hz, the shortest "on" time for a micro mirror (also referred as Least Significant Bit) is $$LSB = 1/((\text{bit depth}) \times (\text{frame rate}) \times \qquad \text{Eqn. (1)}$$
$$(\text{number of color planes}) \times (\text{number of image rows}))$$
$$= 1/(256 \times 60 \text{ Hz} \times 2000)$$
$$= 0.033 \text{ micro second}.$$

To provide a color video display at the same conditions, the shortest "on" time for a micro mirror is thus 0.011 micro second.

FIG. 4 illustrates an exemplified detailed structure for the micro mirror 120Z. In a cross-sectional view along line A-A in FIG. 2, the micro mirror 120Z includes a mirror plate 402 that includes a flat reflective upper layer 403*a* that provides the mirror surface, a middle layer 403*b* that provides the mechanical strength for the mirror plate, and a bottom layer 403*c*. The upper layer 403*a* can be formed of a reflective material, such as, a thin reflective metallic layer. For example, aluminum, silver, or gold can be used to form the upper layer 403*a*. The layer thickness can be in the range of about 200 to 1000 angstroms, such as about 600 angstroms. The middle layer 403*b* can be made of a silicon based material, for example, amorphous silicon, typically about 2000 to 5000 angstroms in thickness. The bottom layer 403*c* can be built of an electrically conductive material that allows the electric potential of the bottom layer 403*c* to be controlled relative to the step electrodes 421*a* or 421*b*. For example, the bottom layer 403*c* can be made of titanium and have a thickness in the range of about 200 to 1000 angstrom.

The mirror plate 402 includes a hinge 406 that is connected with the bottom layer 403*c* (the connections are out of plane of view and are thus not shown in FIG. 4) and is supported by a hinge post 405 that is rigidly connected to a substrate 300. The mirror plate 402 can include two hinges 406 connected to the bottom layer 403*c*. Each hinge 406 defines a pivot point for the mirror plate 402. The two hinges 406 define an axis about which the mirror plate 402 can be tilted. The hinges 406 extend into cavities in the lower portion of mirror plate 402. For ease of manufacturing, the hinge 406 can be fabricated as part of the bottom layer 403*c*.

Step electrodes 421*a* and 421*b*, landing tips 422*a* and 422*b*, and a support frame 408 can also be fabricated over the substrate 300. The height of the step electrodes 421*a* and 421*b* can be in the range from about 0.2 microns to 3 microns. The step electrode 421*a* is electrically connected to an electrode 301 whose voltage Vd can be externally controlled. Similarly, the step electrode 421*b* is electrically connected with an electrode 302 whose voltage Va can also be externally controlled. The electric potential of the bottom layer 403*c* of the mirror plate 402 can be controlled by electrode 303 at potential Vb.

The micro mirror 120Z can be selectively controlled from the group of micro mirrors 120*a* to 120*z*. Bipolar electric pulses can individually be applied to the electrodes 301, 302, and 303. Electrostatic forces can be produced on the mirror plate 402 when electric potential differences are created between the bottom layer 403*c* on the mirror plate 402 and the step electrodes 421*a* or 421*b*. An imbalance between the electrostatic forces on the two sides of the mirror plate 402 causes the mirror plate 402 to tilt from one orientation to another. When the mirror plate 402 is tilted to the "on" position as shown in FIG. 4, the flat reflective upper layer 402*a* reflects the incident light 330 to produce the reflected light 340 along the "on" direction. The incident light 330 is reflected to the "off" direction when the mirror plate 402 is tilted to the "off" position.

The landing tips 422*a* and 422*b* can have a same height as that of a second step in the step electrodes 421*a* and 421*b* for manufacturing simplicity. The landing tips 422*a* and 422*b* provide a gentle mechanical stop for the mirror plate 402 after each tilt movement. The landing tips 422*a* and 422*b* can also stop the mirror plate 402 at a precise angle. Additionally, the landing tips 422*a* and 422*b* can store elastic strain energy when they are deformed by electrostatic forces and convert the elastic strain energy to kinetic energy to push away the mirror plate 402 when the electrostatic forces are removed. The push-back on the mirror plate 402 can help separate the mirror plate 402 and the landing tips 422*a* and 422*b*.

Figure 5:
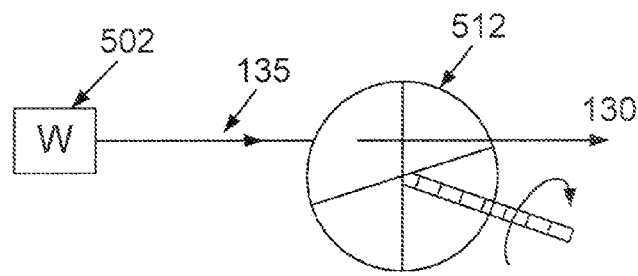
FIGS. 5 and 6 illustrate arrangements for providing colored light sources for a spatial light modulator.

FIG. 5 illustrates an arrangement for providing a colored light source for a spatial light modulator compatible with the ultra-thin display system 100. A white light source 502 emits light 135 that comprises a wide spectrum of wavelengths, such as between about 400 nm and 700 nm. In some embodiments, white light is created by combining different colored lights (e.g. red, green, and blue lights). An example of the white light source 502 is a tungsten light. The light 135 passes through color filters on a spinning color wheel 512. The color wheel 512 can include a plurality of color filters arranged in different angular segments. For example, the color wheel can include six red (R), green (G), and blue (B) color filters sequenced in R, G, B, R, G, and B. After the light 135 passes through the spinning color wheel 512, the light becomes the incident light 130 which will eventually fall upon the micro mirrors 120 of the display system 100. As the color wheel 512 spins, the incident light 130 sequentially alternates colors in a series of image frames each for producing a color pixel in a display image. The tiltable micro mirrors in the spatial light modulator 110 can be selectively tilted to direct the colored incident light 130 to form color pixels in the display image. The selective tilting of the micro mirrors is driven by the input digital image data in the color plane that corresponds to color of the incident light. A computer can synchronize the timing of the color incident light 130 and the input image data of the associated color plane for tilting the tiltable mirrors in the spatial light modulator 110.

Figure 6:
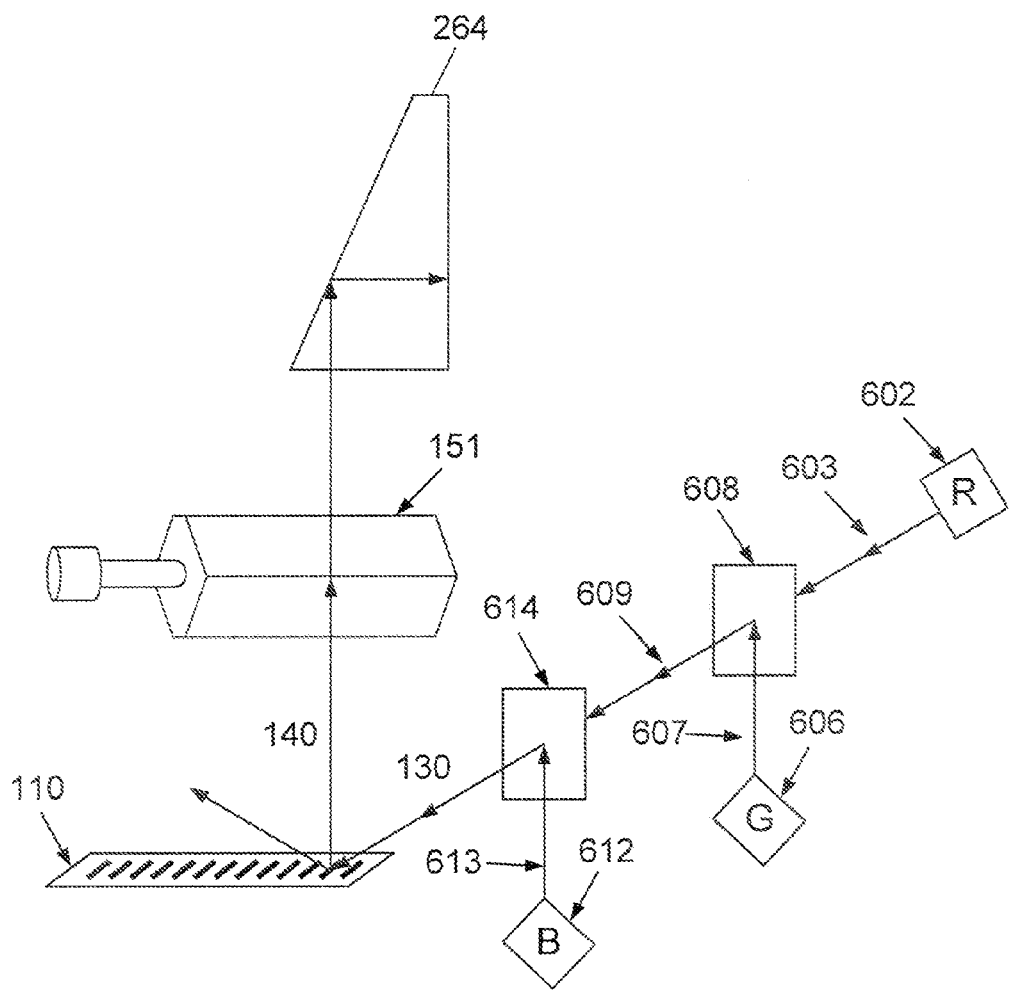

FIG. 6 illustrates another arrangement for providing colored light to the spatial modulator 110. A red light source 602, green light source 606, and blue light source 612 can respectively emit red light 603, green light 607, and blue light 613. The red light source 602, green light source 606, and blue light source 612 can be based on light emitting diode (LED) or semiconductor lasers. The red light 603 or the green light 607 can be input to a beam divider 608 (which in this case acts as a beam combiner) to produce light 609. The beam divider 608 can allow the light beam (i.e. the red light 603) received on one surface to pass through while reflecting another light beam (i.e. the green light 607) received on the opposite surface. The red light source 602 and green light source 606 are controlled such that either red light 603 or the green light 607 is input to the beam divider 608 at any given time. In some implementations, the light sources 602, 603 and 607 are sequentially turned on and off. The light 609 is thus either red or green at any given time. Similarly, light 609 and the blue light 613 are input to a beam divider 614 that can be controlled to output the incident light 130. The blue light source 612 is controlled such that either the light 609 (red or green) or the blue light 613 is input to the beam divider 614 at any given time. By properly controlling the red light source 602, green light source 606, and blue light source 612, a single color incident light 130 (red, green, or blue) can sequentially illuminate the spatial light modulator 110. The tiltable micro mirrors in the spatial light modulator 110 can be selectively tilted to direct the colored incident light 130 to form color pixels in the display image. The selective tilting of the micro mirrors is driven by the input digital image data in the color plane that corresponds to color of the incident light. A computer can synchronize the timing of the color incident light 130 and the input image data of the associated color plane for tilting the tiltable mirrors in the spatial light modulator 110.

Figure 7:
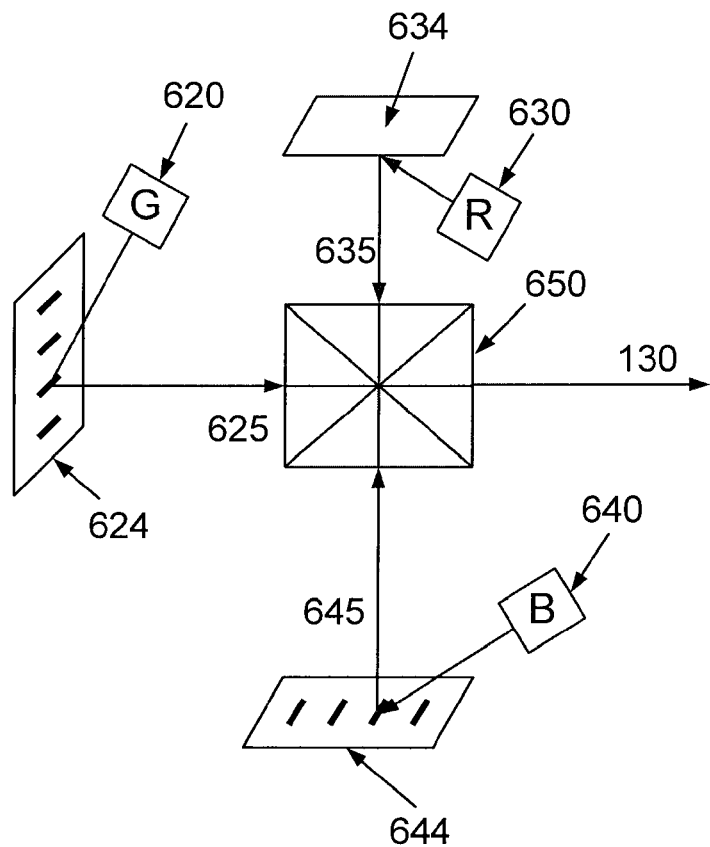
FIGS. 7 and 8 illustrate arrangements for providing colored light sources and corresponding spatial light modulators.
Figure 8:
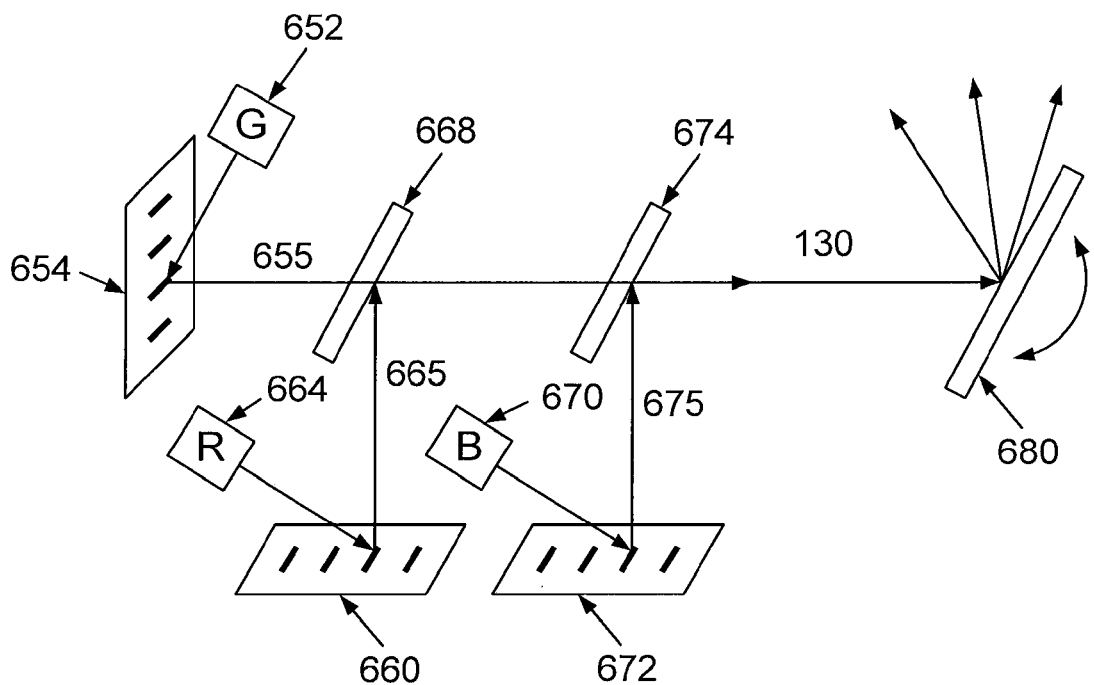

FIGS. 7 and 8 illustrate other arrangements for providing colored light sources for the ultra-thin display system 100. Unlike the arrangements shown in FIGS. 5 and 6, separate spatial modulators are provided for producing different color pixels of the display image. In FIG. 7, tiltable mirrors in a spatial light modulator 634 can selectively reflect the red light emitted from the red light source 630 to produce spatially modulated red light 635. Tiltable mirrors in a spatial light modulator 624 can selectively reflect the green light emitted from the green light source 620 to produce spatially modulated green light 625. Tiltable mirrors in a spatial light modulator 644 can selectively reflect the blue light emitted from the blue light source 640 to produce spatially modulated blue light 645. The spatial light modulators 624, 634, and 644 can each include a plurality of tiltable mirrors distributed in one or more rows. The spatially modulated single color light (625, 635, and 645) is combined by an X-Cube 650 to produce the multi-colored incident light 130. The X-Cube 650 includes two diagonal single-pass interfaces to allow the modulated green light 625 to pass through and the modulated red light 635 and the modulated blue light 645 to be reflected. The modulated colored light (625, 635, and 645) merges to form the incident light 130. In contrast to the sequential color modulations shown in FIGS. 5 and 6, different colored light can be directed simultaneously by the three spatial light modulators 624, 634, and 644.

Similar to the arrangement shown in FIG. 7, the red, green, and blue light is respectively emitted from red light source 664, the green light source 652, and the blue light source 670 as shown in FIG. 8. The red, green, and blue light is further selectively reflected respectively by the tiltable mirrors in spatial light modulators 660, 654, and 672 to produce spatially modulated color light 655, 665, and 675. The spatially modulated single-color light 655, 665, and 675 is combined by beam dividers 668 and 674 to produce spatially modulated multi-color incident light 130. The spatially modulated incident light 130 is directed by a rotating mirror 680 (or a polygon) to form a color display image. An advantage of the arrangements shown in FIGS. 7 and 8 is that different color pixels can be formed simultaneously in the display image, which can provide higher display frame rate in video image display, or relax the response rates required for the micro mirrors in the spatial light modulators.

It is understood that the disclosed systems and methods are compatible with other configurations of micro mirrors, optical scanning system, and displays without deviating from the spirit of the present specification. In some implementations, the beam dividers and the light sources are configured in different order or to reflect rather than allow light to pass through. The micro mirrors in the disclosed systems and methods can generally include mirrors that are made by micro-fabrication techniques and can tilt in one or more orientations under electronic control. Different light sources can be used by the disclosed display system. Where a single color is referred to, the single color can include a number of wavelengths that together appear as a color, such as green, red or blue, to an observer.

In addition, the parameters used above are meant to be examples for illustrating the operations of the disclosed display system. The disclosed display system can operate at different operating conditions without deviating from the spirit of the present specification. The display image discussed in relation with in FIGS. 1*a* and 1*b* can be aligned in different orientations relative to the viewers. For example, the disclosed display system can be configured such that the display image is 4000 pixels wide and 2000 pixels high by using one or more rows of micro mirrors each containing 2000 micro mirrors and scanning 4000 image lines in the vertical direction. Furthermore, the light modulated by the spatial light modulator based on one or more rows of micro mirrors can be scanned by optical systems other than the polygon, as shown in FIGS. 1*a* and 1*c*.

It is also understood that the row direction of the micro mirrors can be aligned along the long dimension of the first face 265 of the tapered plate 260 (instead of along the short dimension of the first face 265 as shown in FIGS. 1*a* and 1*b*). The axis of the polygon can be aligned along the row direction of the micro mirrors. The lines of image pixels formed on the display area are parallel to the row direction of the micro mirrors, that is, along the lateral direction 165. As the polygon rotates, the light reflected from the polygon scans along the slope direction of the second face 266. Parallel lines of image pixels will be produced along the horizontal on the third face 267 of the tapered plate 260, wherein the different lines of image pixels are displaced in the vertical direction on the third face 267 of the tapered plate 260.

What is claimed is:

1. An image display system, comprising:
   a transparent tapered plate comprising a first face, a second face, and a third face, wherein the first face is substantially smaller than the second face and the third face;
   a row of tiltable mirror plates each comprising a reflective surface, wherein each of the mirror plates is configured to tilt to an "on" position to reflect incident light in an "on" direction or to tilt to an "off" position to reflect incident light in an "off" direction; and
   an optical scanning system configured to control the direction of the light reflected by the mirror plates in the "on" direction, wherein the row of the tiltable mirror plates, the optical scanning system and the tapered plate are configured to allow the light reflected by the mirror plates in the "on" direction to enter the tapered plate at the first face, be reflected by the second face, and produce a first line of image pixels in a display image on the third face and the optical scanning system is configured to scan the light reflected by the mirror plates in the "on" direction across the first face.

2. The image display system of claim 1, wherein the first face, the second face, and the third face are substantially flat.

3. The image display system of claim 2, wherein the second face is oriented at an angle smaller than 30 degrees relative to the third face.

4. The image display system of claim 2, wherein the second face is oriented at an angle smaller than 15 degrees relative to the third face.

5. The image display system of claim 2, wherein the second face and the third face are separated by the first face and a fourth face opposing the first face.

6. The image display system of claim 2, wherein the second face and the third face intersect and form a wedge between the second face and the third face.

7. The image display system of claim 1, wherein the first face is substantially perpendicular to the third face.

8. The image display system of claim 1, wherein the tapered plate comprises two opposing faces each of which intersects with each of the first face, the second face, and the third face.

9. The image display system of claim 1, wherein the light entering the tapered plate at the first face is totally reflected at the second face.

10. The image display system of claim 1, wherein the optical scanning system comprises:
    a reflective surface configured to reflect the light in the "on" direction toward the first face of the tapered plate; and
    a transport mechanism configured to change the orientation of the reflective surface to produce a second line of image pixels in the display image.

11. The image display system of claim 1, wherein each mirror plate of the tiltable mirror plates is connected with two hinges supported by a substrate and the mirror plate is configured to tilt about an axis defined by the two hinges.

12. The image display system of claim 11, wherein the mirror plate is configured to tilt when an electrostatic force is applied to the mirror plate.

13. The image display system of claim 11, wherein the transparent tapered plate is made of glass.

14. The image display system of claim 1, further comprising one or more colored light sources each configured to produce the incident light in a single color.

15. The image display system of claim 14, further comprising two or more spatial light modulators each including a row of tiltable mirror plates, wherein the tiltable mirror plates in each of the two or more spatial light modulators are configured to receive the incident light in substantially a single color.

16. The image display system of claim 14, further comprising at least one of a beam divider and a X-cube, wherein the beam divider or the X-cube is configured to change the direction of the light emitted by at least one of the one or more colored light sources.

17. A method for producing a display image, comprising:
    selectively tilting one or more one or more tiltable mirror plates to "on" positions, wherein the tiltable mirror plates are distributed in one or more rows;
    reflecting an incident light toward an "on" direction at the one or more tiltable mirror plates that are tilted to the "on" positions;
    receiving the light in the "on" direction at a first face of a transparent tapered plate;
    reflecting the light entering the first face of the tapered plate at a second face of the tapered plate;
    forming a first line of image pixels in a display image on a third face of the tapered plate, wherein the first face is substantially smaller than the second face and the third face; and
    changing the direction of the light in the "on" direction using a scanning system to produce a second line of image pixels in the display image on the third face of the tapered plate.

18. The method of claim 17, wherein the light is totally reflected by the second face.

19. The method of claim 17, wherein the first face, the second face, and the third face are substantially flat.

20. The method of claim 19, wherein the second face is oriented at an angle smaller than 30 degrees relative to the third face.

21. The method of claim 19, wherein the second face is oriented at an angle smaller than 15 degrees relative to the third face.

22. The method of claim 17, wherein the first face is substantially perpendicular to the third face.

23. The method of claim 17, wherein the step of changing the direction of the light in the "on" direction comprises:
    reflecting the light in the "on" direction using a reflective surface of the scanning system to form the first line of image pixels in the display image; and
    changing the orientation of the reflective surface to produce the second line of image pixels in the display image.

24. The method of claim 17, wherein the step of selectively titling comprises:
    selectively applying an electrostatic force to at least one of the titlable mirror plates; and
    tilting at least one of the titlable mirror plates.

25. The method of claim 17, wherein the transparent tapered plate is made of glass.

26. The method of claim 17, further comprising producing the incident light in different colors by different colored light sources.

27. The method of claim 26, further comprising selectively reflecting the incident light in the different colors by different tiltable mirror plates.

28. The method of claim 26, further comprising selectively reflecting the incident light in the different colors by the same tiltable mirror plates.

29. The method of claim 26, further comprising changing the direction of the colored light emitted by at least one of the one or more colored light sources by a beam divider or a X-cube to produce the incident light.

30. A display system, comprising:
a first light source configured to emit a first color of light;
a first beam divider through which passes the first color of light;
a second light source configured to emit a second color of light toward the first beam divider;
a second beam divider through which the first color of light and the second color of light pass;
a third light source configured to emit a third color of light toward the second beam divider, wherein one of the first color of light, the second color of light or the third color of light from the second beam divider creates incident light;
a row of tiltable mirror plates each comprising a reflective surface, wherein each of the mirror plates is configured to tilt to an "on" position to reflect the incident light in an "on" direction or to tilt to an "off" position to reflect the incident light in an "off" direction;
a transparent tapered plate comprising a first face, a second face, and a third face, wherein the first face is substantially smaller than the second face and the third face; and
an optical scanning system configured to control the direction of the light reflected by the mirror plates in the "on" direction toward the transparent tapered plate;
wherein the row of the tiltable mirror plates, the optical scanning system and the tapered plate are configured to allow the light reflected by the mirror plates in the "on" direction to enter the tapered plate at the first face, be reflected by the second face, and produce a line of image pixels on the third face and the optical scanning system is configured to scan the light reflected by the mirror plates in the "on" direction across the first face.

31. A display system, comprising:
a first light source configured to emit a first color light;
a first row of tiltable mirror plates each comprising a reflective surface, wherein each of the mirror plates is configured to tilt to an "on" position to reflect the first color light in an "on" direction or to tilt to an "off" position to reflect the first color light in an "off" direction;
a second light source configured to emit a second color light;
a second row of tiltable mirror plates each comprising a reflective surface, wherein each of the mirror plates is configured to tilt to an "on" position to reflect the second color light in an "on" direction or to tilt to an "off" position to reflect the second color light in an "off" direction;
a third light source configured to emit a first color light;
a third row of tiltable mirror plates each comprising a reflective surface, wherein each of the mirror plates is configured to tilt to an "on" position to reflect the third color light in an "on" direction or to tilt to an "off" position to reflect the third color light in an "off" direction;
a beam divider or a X-cube configured to change the direction of at least one of the first color light, the second color light or the third color light reflected in the "on" direction;
a transparent tapered plate comprising a first face, a second face, and a third face, wherein the first face is substantially smaller than the second face and the third face; and
an optical scanning system configured to control the direction of the light from the beam divider or X-cube toward the transparent tapered plate;
wherein the optical scanning system and the tapered plate are configured to allow the light to enter the tapered plate at the first face, be reflected by the second face, and produce a line of image pixels on the third face and the optical scanning system is configured to scan the light reflected by the mirror plates in the "on" direction across the first face.

32. The image display system of claim 31, further comprising a fourth row of tiltable mirror plates each comprising a reflective surface, wherein each of the mirror plates is configured to tilt to an "on" position to reflect the incident light from the beam divider or the X-cube in an "on" direction toward the optical scanning system or to tilt to an "off" position to reflect incident light from the beam divider or the X-cube away from the optical scanning system.

33. A display system, comprising:
a first light source configured to emit a first color light;
a first row of tiltable mirror plates each comprising a reflective surface, wherein each of the mirror plates is configured to tilt to an "on" position to reflect the first color light in an "on" direction or to tilt to an "off" position to reflect the first color light in an "off" direction;
a second light source configured to emit a second color light;
a second row of tiltable mirror plates each comprising a reflective surface, wherein each of the mirror plates is configured to tilt to an "on" position to reflect the second color light in an "on" direction or to tilt to an "off" position to reflect the second color light in an "off" direction;
a first beam divider through which the first color light in the "on" direction passes and which redirects the second color light in the "on" direction;
a third light source configured to emit a third color light;
a third row of tiltable mirror plates each comprising a reflective surface, wherein each of the mirror plates is configured to tilt to an "on" position to reflect the third color light in an "on" direction or to tilt to an "off" position to reflect the third color light in an "off" direction;
a second beam divider through which the first color light and the second color light pass and which redirects third color light in the "on" direction;
a transparent tapered plate comprising a first face, a second face, and a third face, wherein the first face is substantially smaller than the second face and the third face; and
an optical scanning system configured to control the direction of the light from the second beam divider toward the transparent tapered plate;
wherein the optical scanning system and the tapered plate are configured to allow the light reflected by the mirror plates in the "on" direction to enter the tapered plate at the first face, be reflected by the second face, and produce a line of image pixels on the third face and the optical scanning system is configured to scan the light reflected by the mirror plates in the "on" direction across the first face.

* * * * *

UNITED STATES PATENT AND TRADEMARK OFFICE
CERTIFICATE OF CORRECTION

PATENT NO.        : 7,391,556 B2
APPLICATION NO. : 11/461413
DATED             : June 24, 2008
INVENTOR(S)       : Shaoher X. Pan It is certified that error appears in the above-identified patent and that said Letters Patent is hereby corrected as shown below:

Column 12, Lines 16-17 at Claim 17; replace:
"selectively tilting one or more one or more tiltable mirror plates to "on" positions, wherein the tiltable mirror" with
-- selectively tilting one or more tiltable mirror plates to "on" positions, wherein the one or more tiltable mirror --

Column 12, Line 58 at Claim 24; replace:
"the titlable mirror plates; and" with
-- the tiltable mirror plates; and --

Column 12, Line 59 at Claim 24; replace:
"tilting at least one of the titlable" with
-- tilting at least one of the tiltable --

Signed and Sealed this

Ninth Day of September, 2008

JON W. DUDAS
*Director of the United States Patent and Trademark Office*